United States Patent [19]

Shizuya

[11] 4,281,348
[45] Jul. 28, 1981

[54] TELEVISION SIGNAL RECEIVING APPARATUS

[75] Inventor: Osamu Shizuya, Higashi-Osaka, Japan

[73] Assignee: Matsushita Electric Industrial Co., Ltd., Kadoma, Japan

[21] Appl. No.: 63,098

[22] Filed: Aug. 2, 1979

[51] Int. Cl.³ .............................................. H04N 5/44
[52] U.S. Cl. .................................... 358/188; 455/44; 455/307
[58] Field of Search ...................... 358/188, 160, 167; 455/307, 205, 257, 255, 44

[56] References Cited

U.S. PATENT DOCUMENTS

| 2,315,050 | 3/1943 | Crosby | 455/44 |
| 3,921,077 | 11/1975 | Suzuki | 455/307 |

*Primary Examiner*—Richard Murray
*Attorney, Agent, or Firm*—Cushman, Darby & Cushman

[57] ABSTRACT

In apparatus for receiving a television signal which is made by a frequency-modulation by a video signal, the improvement is that a band-pass filter provided in the receiver for selectively taking out selected television signal is designed in a manner to have a center frequency shifted from a frequency corresponding to the center level of the video signal to the side of another frequency corresponding to white-signal level, so that noises of the picture in small signal receiving is decreased.

6 Claims, 11 Drawing Figures (a)

(b)

input voltage

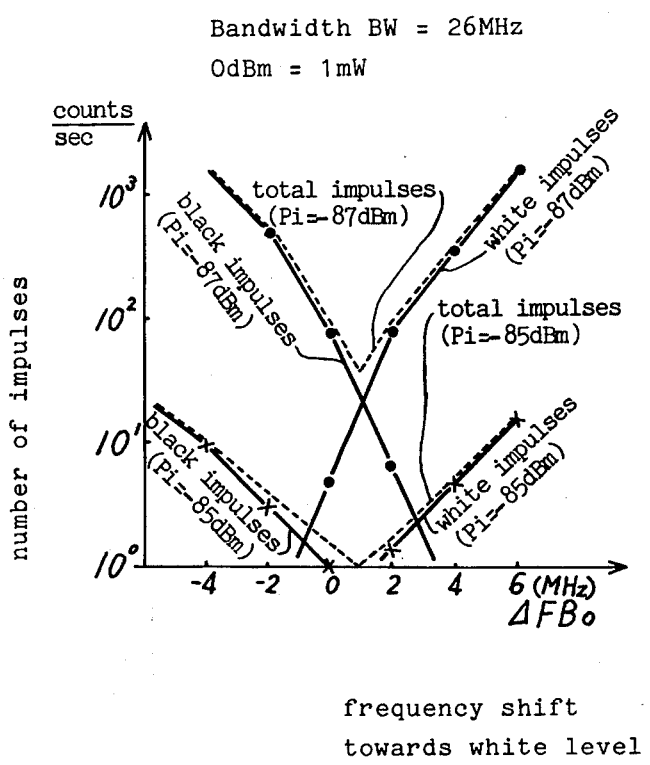

TELEVISION SIGNAL RECEIVING APPARATUS

BACKGROUND OF THE INVENTION

1. Field of the Invention

The present invention relates to an improvement of a television signal receiving apparatus. This invention particularly concerns an improvement of a television signal receiving apparatus for receiving a television signal which is made by a frequency modulation by a video signal.

2. Background of the Invention

In the receiving of a television signal, which is made by a frequency modulation by a video signal, there has been a problem that black impulse noise and white impulse noise are likely to be produced in the reproduced picture, especially when the power of the received television signal is weak. Hitherto, no effective measure for decreasing such noises on the reproduced picture has been proposed.

SUMMARY OF THE INVENTION

The present invention, therefore, purports to provide an improved television signal receiving apparatus capable of reproducing picture of an improved quality. The television signal receiving apparatus of the present invention is suitable for receiving a television signal which is made by frequency modulation by a video signal. Accordingly, the apparatus in accordance with the present invention is suitable for use in a television signal relaying or transmission system, and in particular, in a satellite television broadcasting system.

BRIEF DESCRIPTION OF THE DRAWING

FIGS. 4($b$) and FIG. 4($c$) are time charts to elucidate generation of a noise in the video signal.

FIG. 7($b$) is a graph showing relation between the center frequency and an AGC voltage of the apparatus of FIG. 6.

FIG. 8 is a graph showing experimental data of noises of the picture and shifting of the center frequency of a band-pass filter, of one example of the present invention.

DESCRIPTION OF THE PREFERRED EMBODIMENT

Figure 1:
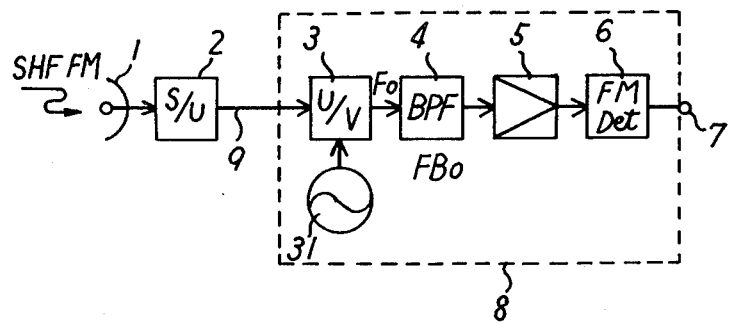
FIG. 1 is a circuit diagram showing general construction of a known television signal receiver for elucidating principle of the present invention.

First, principle of the present invention is elucidated with reference to FIGS. 1 to 5. FIG. 1 shows a general construction of a known satellite television signal receiver, wherein the output terminal of a parabolic antenna 1 disposed outdoor is connected to the input terminal of an SHF-UHF converter 2, which converts the SHF television signal into a UHF television signal and gives it through a UHF cable 9 to the input terminal of a UHF-VHF converter, i.e., a second frequency converter 3 in an indoor unit 8. The second frequency converter 3, utilizing the output signal of the local oscillator 31, converts the UHF signal into a signal Fo of a second intermediate frequency (herein after II-IF) and gives it through a band-pass filter 4 to a second intermediate frequency amplifier (herein after II-IF amplifier) 5. The II-IF amplifier 5 is a known automatic-gain-controlled amplifier and amplifies II-If signal of FM signal and gives the signal to a known FM detector 6 comprising a known limiter and a discriminator. The FM detector 6 detects the II-IF signal and issues detected multiple signal consisting of a video signal and a sound subcarrier signal to an output terminal 7.

In the abovementioned construction, according to known Carson's rule of FM modulation, the following equations hold:

$$FBo = Fo \qquad (1) \text{ and}$$

$$B = 2(\Delta F + fm) \qquad (2),$$

wherein,

Fo is the second intermediate frequency (II-IF), fm is the maximum frequency component included in the video signal, $\Delta F$ is the maximum frequency shift of FM signal, FBo is the center frequency of the band-pass filter 4, B is the bandwidth of the FM signal.

In the conventional system, the televisiton signal receiving apparatuses for receiving the FM television signal have been designed in a manner to fulfil the conditions of the abovementioned equations.

However, the present inventor empirically found that the noises in the reproduced picture are more decreased when the center frequency FBo is shifted from II-IF Fo, which is a frequency corresponding to the center level of the video signal, to the side of another frequency corresponding to an instantaneous frequency of white-signal level.

Figure 2:
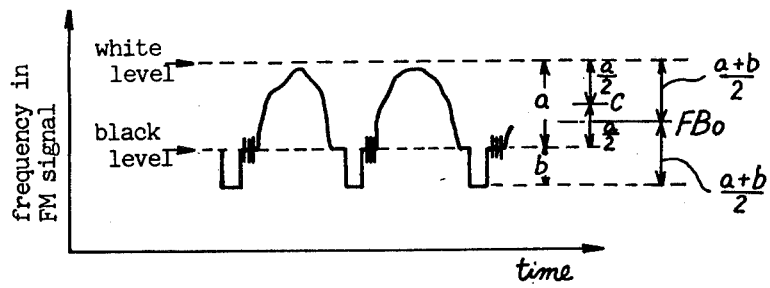
FIG. 2 is a waveform diagram showing a waveform of a video signal.

Hereinafter, the principle of the present invention is elucidated further in detail. The television carrier is modulated by a modulating signal consisting of a picture signal component and a synchronization signal component as shown in FIG. 2. And, the ratio of the maximum frequency deviation "a" (, corresponding to a change from black level to white level,) for the video signal component and the frequency deviation "b" for the synchronization signal component is selected to be 7:3. As shown in FIG. 2, the instantaneous levels of the video signal correspond to instantaneous frequencies of the FM signal of II-IF. In the conventional receiving apparatus, the center frequency FBo of the band-pass filter 4 is selected at the frequency that is the center of the sum of frequency deviations of a+b. Accordingly, the filter center frequency FBo lies, not at the center of the video frequency deviation "a", but rather nearing to the side corresponding to black level, by a shift of frequency of $(3/14) \times a$.

Figure 3:
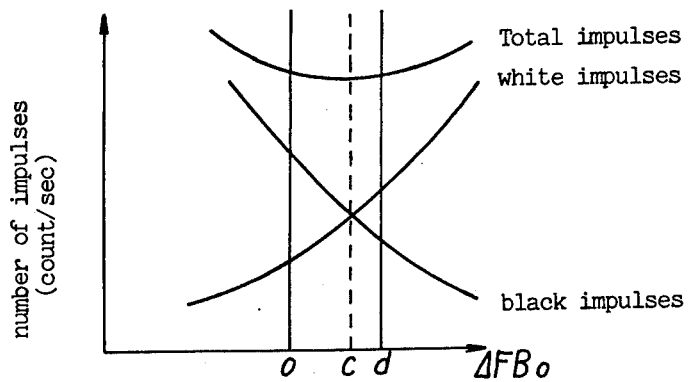
FIG. 3 is a graph showing a general relation between noises of the picture and shifting of the center frequency of a band-pass filter, of a television signal receiving apparatus.
Figure 4:
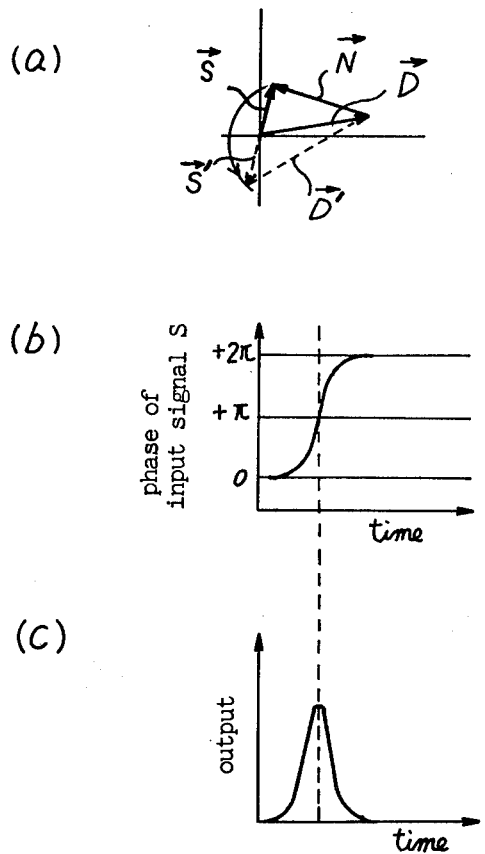
FIG. 4($a$) is a vector diagram for elucidating an effect of noise to the video signal.

In receiving satellite broadcasting, the input SHF signal is not sufficiently strong, and therefore, the receiving of the frequency-modulated FM signal is made at the vicinity of its FM threshold level, namely at the condition where carrier/noise ratio is small. As is well known, in such receiving of the FM signal at the vicinity of the threshold level, there are problems of triangular noise and impulse noise which are peculiar to FM. Especially, at the vicinity of the threshold level, the impulse noise rapidly increases as the power of the input signal becomes smaller. On the picture, the influence of the impulse noises are divided into generations of black impulse noises and white impulse noises. The relation between the shifting $\Delta FBo$ of the center frequency $FBo$ of the band-pass filter 4 and numbers of black impulse noise, white impulse noise and their total are shown in FIG. 3. As shown in FIG. 3, at the zero frequency shift ($\Delta FBo=0$), where the conventional television receiving apparatus put the central frequency, the black impulse noise is superior to the white impulse noise. On the other hand, number of both the black impulse noise and the white impulse noise are relatively small, and also the total thereof is minimum at the frequency shift of $\Delta FBo=c$, where the center frequency $FBo$ of the band-pass filter is selected at the center of the frequencies corresponding to the white level and black level of the video signal, as shown by FIG. 2.

The inventor empirically found that the best result in decreasing the noises in picture is obtained at a further shift to $\Delta FBo=d$ of the center frequency $FBo$ of the band-pass filter. Namely, picture of lowest noise is obtainable by selecting the center frequency $FBo$ to such a frequency that is nearer to the frequency corresponding to the white level, exceeding the center frequency c of the frequency range "a" for the picture signal. This empirical fact would be able to be elucidated that average human eye would feel the black impulse noises stronger than white impulse noises.

The reason of generation and nature of the impulse noises induced in the video signal can be elucidated as follows:

The genuine video signal and noise can be shown by a vector diagram as shown in FIG. 4(a), wherein $\vec{D}$ represents a vector of the genuine video signal, $\vec{N}$ represents that of a noise such as a thermal noise in the receiving apparatus and $\vec{S}$ represents that of composite vector of the vectors $\vec{D}$ and $\vec{N}$. As the time passes, the thermal noise vector changes its length and direction, for example, to that shown by the dotted line arrow $\vec{D'}$. Accordingly, the composite vector changes from $\vec{S}$ to $\vec{S'}$ as shown in FIG. 4(a), and during the change that tip of the vector moves around the origin point of the vector D by changing the vector direction by $2\pi$. Since the output of the FM detector 6 is proportional to time differential of the instantaneous phase of carrier, the abovementioned $2\pi$ change of the composite vector produces an impulse noise shown by FIG. 4(c) and the impulse forms black or white noise.

In order to suppress such impulse noises, hitherto have been proposed FM feedback demodulation system, phase lock demodulation system and multiple loop feedback FM demodulation system. However, such systems require very complicated constructions, and therefore make the receiving apparatus too much expensive for home appliances such as satellite direct receiving apparatus of home use.

Figure 5:
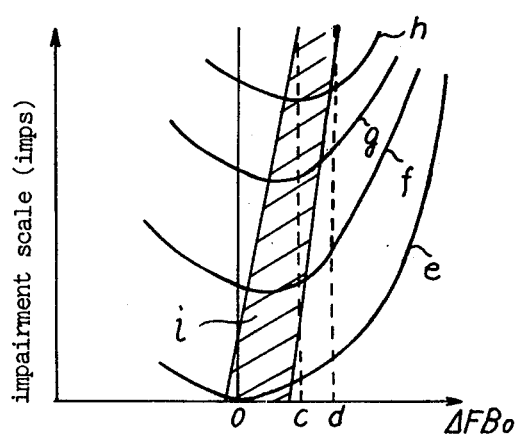
FIG. 5 is a graph showing relations between frequency shifts $\Delta FBo$ of the center frequency of a band-pass filter of a television signal receiving apparatus and impairment scales of the reproduced picture.

Next, picture impairment scale due to factors other than the impulse noise characteristic, for example, differential gain and differential phase of the video signal, residual buz noise and distorsion of synchronizing signal has the characteristics as shown by a curve e of FIG. 5 which shows relation between the center frequency shift and the impairment scale. As shown by the curve e, the picture impairment scale becomes worse as the shift of the central frequency of the band-pass filter 4 from the center frequency of the frequency ranges a+b of FIG. 2 increases. This is caused by known group delay characteristic of a band-pass filter. Curves f,g and h show total picture impairment characteristics including the abovementioned impulse noise characteristic, wherein the parameter of the curves e to h is the input video signal power intensity. As shown by these curves, as the input television signal power becomes smaller, the impairment scale becomes worse, and further, the condition for obtaining minimum impairment scale shifts from the condition of $\Delta FBo=o$ to the condition of $\Delta FBo=c$ or $\Delta FBo=d$.

Summarizing the above, the shift of the center frequency should be greater towards the white level frequency as the input television signal is smaller, and for a sufficiently large input television signal the condition of $\Delta FBo=O$ of the conventional apparatus is acceptable.

Accordingly, in an apparatus for receiving a television signal which is made by a frequency-modulation by a video signal, the improvement in accordance with the present invention is that a band-pass filter provided in the receiver for selectively taking out the video signal has a center frequency which is selected between an instantaneous frequency corresponding to the center level of the video signal and another instantaneous frequency corresponding to white-signal level.

Figure 6:
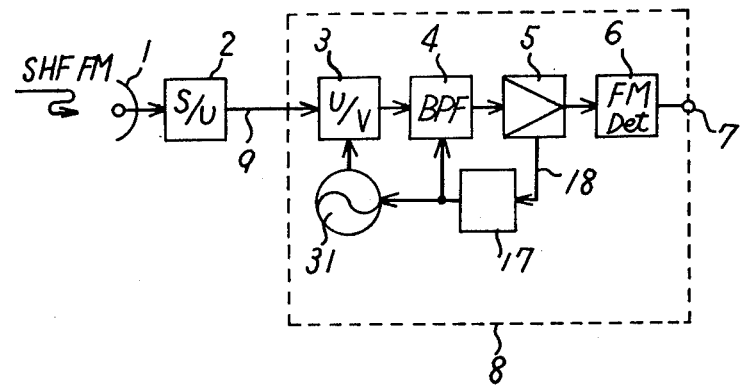
FIG. 6 is a circuit diagram showing an example of television signal receiving apparatus, embodying the present invention.
Figure 7:
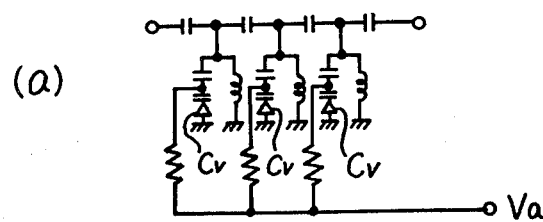
FIG. 7($a$) is an example of a band-pass filter in the television signal receiving apparatus.
Figure 7:
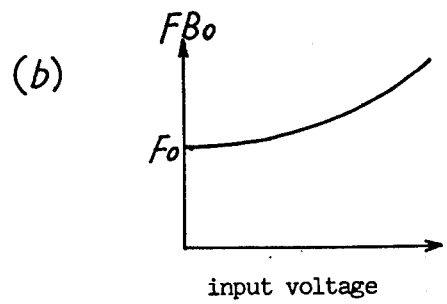

A preferred embodiment of the present invention is elucidated with reference to FIGS. 6 and 7.

In the circuit shown in FIG. 6, the output terminal of a parabolic antenna 1 disposed outdoor is connected to the input terminal of an SHF-UHF converter 2, which converts the SHF FM television signal into a UHF FM television signal and gives it through a UHF cable 9 to a input terminal of a UHF-VHF converter, i.e., a second frequency converter 3 in an indoor unit 8. The second frequency converter 3, utilizing the output signal of the local oscillator 31, converts the UHF signal into a signal Fo of a second intermediate frequency (II-IF) and gives it through a band-pass filter 4 to a second intermediate frequency amplifier (II-IF amplifier) 5. The II-IF amplifier 5 is a known automatic-gain-controlled amplifier and amplifies II-IF signal of FM signal and gives the signal to a known FM detector 6 comprising a known limiter and a discriminator. The FM detector 6 detects the II-IF signal and issues detected multiplex signal consisting of a video signal and a sound subcarrier signal to the output terminal 7. The II-IF amplifier 5 gives a signal, which is corresponding to the input signal power level, through a connection 18 to a voltage control circuit 17. Then, the voltage control circuit 17 feeds control voltages to the band-pass filter 4 and to the local oscillator 31, so that the band-pass filter 4 changes its center frequency and the local oscillator 31 changes its oscillating frequency. FIG. 7(a) shows one example of a circuit construction of a known band-pass filter 4, where variable capacitance diodes Cv are connected in series to capacitors of each of tank circuits, and a bias voltage is impressed to the variable capacitance diodes Cv from a bias voltage terminal Va. The band-pass filter 4 shows the characteristic curve as shown by FIG. 7(b), where abscissa indicates the voltage impressed across their electrodes and ordinate indicates the change of the center frequency FBo. By means of the voltage change at the connection 18, the characteristic of the band-pass filter 4 is controlled in a manner that the frequency shift of the center frequency is made responding to the intensity of the input television signal in the hatched area in FIG. 5. The oscillation frequency of the local oscillator 31 of the second frequency converter 3 is also controlled by other variable capacitance elements in a manner that the selection can be made easily by application of suitable control voltage by the voltage control circuit 17.

FIG. 8 shows curves of measured relations between the frequency shift ΔFBo of the center frequency FBo of the band-pass filter 4 of an embodiment of FIG. 6 and counts of white impulse noise, black impulse noise and total thereof. In the embodiment, the bandwidth "a" of the video signal is 12 MHz and the bandwidth BW of the band-pass filter 4 is 26 MHz. The parameter is the input power "Pi" of the television signal. As the curves show, the best performance with respect to noise is obtainable when the frequency shift ΔFBo is between 1 to 1.5 MHz towards white level side. By the shifting of the center frequency FBo, the (Carrier/Noise) figure is improved to a value equivalent to that when the apparatus receives a television signal of a power 1 to 2 dB stronger than actually receiving.

As has been elucidated in detail, by selecting the center frequency of the band-pass filter in a specified manner, the receiving apparatus in accordance with the present invention is capable of reproducing the picture with an improved quality. Therefore lowest input television signal for enabling direct receiving of satellite broadcast is 1 to 2 dB lower than that of the conventional apparatus. This enables use of smaller parabolic antenna and use of receiving sets with a higher noise figure, and hence will enable mass production of cheaper receiving apparatus than the conventional one.

What is claimed is:

1. In an apparatus for receiving an FM television signal, the carrier wave thereof being frequency-modulated by a video signal including a synchronizing component and a video component with an amplitude larger than that of said synchronizing component, said apparatus comprising a band-pass filter for selectively taking out said FM television signal with a pass band width corresponding to one channel and an FM detector for reproducing said video signal by FM-detecting said FM television signal taken out from said band-pass filter, the improvement is that the center frequency of the pass band of said band-pass filter is set to be a frequency shifted from the center frequency of said FM television signal to the side of an instantaneous frequency modulated by a white level video signal.

2. The apparatus of claim 1, wherein said band-pass filter comprises resonance circuits containing variable capacitance elements, and a control circuit for impressing a voltage responding to the intensity of the input FM television signal on said variable capacitance elements.

3. An apparatus in accordance with claim 1, characterized by further comprising a frequency converter containing a local oscillator, the oscillation frequency thereof being adjusted by intensity of the input FM television signal.

4. The apparatus of claim 3, wherein said local oscillator comprises variable capacitance elements, and a control circuit for impressing a voltage responding to the intensity of the input FM television signal on said variable capacitance elements.

5. The apparatus of claim 3, wherein said band-pass filter comprises resonance circuits containing variable capacitance elements, and said local oscillator comprises variable capacitance elements, and the apparatus further comprises a control circuit for impressing control voltages responding to the intensity of the input FM television signal on said variable capacitance elements.

6. The apparatus of claim 1, 2, 3, 4 or 5 wherein a maximum frequency shift of said frequency shifted from the center frequency of said FM television signal is selected to be about 3/14×a, where "a" is the maximum frequency deviation of said video signal.

* * * * *